2,832,762

MONOAZO DYESTUFFS AND COMPLEX METAL COMPOUNDS THEREOF

Christian Zickendraht, Binningen, and Alfred Fasciati, Bottmingen, Switzerland, assignors to Ciba Limited, Basel, Switzerland, a Swiss firm No Drawing. Application January 10, 1955
Serial No. 481,037

Claims priority, application Switzerland
January 15, 1954

4 Claims. (Cl. 260—147)

This invention provides new monoazo-dyestuffs of the formula (1)

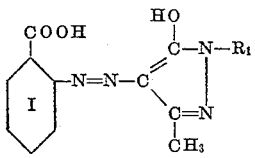

in which $R_1$ represents a benzene radical which is free from groups imparting solubility in water and is bound in the 1-position to the nitrogen atom of the pyrazolone ring and contains an alkyl group in the 2-position, and in which the benzene nucleus I may contain substituents not imparting solubility in water.

The invention also provides complex metal compounds, especially complex chromium compounds of these azo dyestuffs, and a process for making these metal compounds by treating an azo dyestuff of the above formula with an agent yielding metal.

The monoazo-dyestuffs of the above formula can be made by coupling a diazotized 2-aminobenzene-1-carboxylic acid, which may contain substituents not imparting solubility in water, such as a nitro or alkoxy group or a halogen atom, for example, a chlorine atom, with a 1-phenyl-3-methyl-5-pyrazolone which is free from groups imparting solubility in water and contains an alkyl group, advantageously an alkyl group containing two carbon atoms, in the 2'-position of the phenyl radical bound in the 1'-position to the pyrazolone ring.

As examples of such 1-phenyl-3-methyl-5-pyrazolones there may be mentioned:

1-(2':4'-dimethylphenyl)-3-methyl-5-pyrazolone
1-(2':6'-dimethylphenyl)-3-methyl-5-pyrazolone
1-(2'-methyl-6'-chlorophenyl)-3-methyl-5-pyrazolone
1 - (2' - methyl - 6' - methoxyphenyl) - 3 - methyl - 5-pyrazolone and advantageously
1-(2'-methylphenyl)-3-methyl-5-pyrazolone and above all
1-(2'-ethylphenyl)-3-methyl-5-pyrazolone As examples of 2-aminobenzene-1-carboxylic acids there come into consideration, for example, 4- or 5-nitro - 2 - aminobenzene - 1 - carboxylic acid, 4-methoxy-2-aminobenzene-1-carboxylic acid, 5-chloro-2-aminobenzene-1-carboxylic acid and above all 2-amino-1-carboxylic acid itself.

The diazotized 2-aminobenzene-1-carboxylic acid may be coupled with the pyrazolone by methods in themselves known, for example, in a weakly acid to alkaline medium.

After the coupling reaction and for the chroming treatment the dyestuff can easily be isolated from the coupling mixture by filtration, if desired, after the addition of sodium chloride. It is of advantage to subject the dyestuff to metallization in the form of the filter cake without intermediate drying. In some cases it is possible to carry out the chroming treatment directly in the coupling mixture, that is to say, without intermediate separation of the dyestuff.

The new monoazo-dyestuffs are generally sufficiently soluble in water in the form of alkali compounds to enable them to dye well, for example, by the single bath chroming process or after-chroming process, from dyebaths which need contain no or only a small addition of acid.

As agents yielding chromium there may be used, for example, simple chromium salts, such as chromium fluoride, chromium sulfate, chromium acetate, or complex chromium compounds of aliphatic dicarboxylic acids or hydroxy-carboxylic acids, or advantageously complex chromium compounds or aromatic ortho-hydroxy-carboxylic acids. As examples of aliphatic dicarboxylic acids or hydroxy-carboxylic acids there may be mentioned, inter alia, oxalic acid, lactic acid, glycollic acid, citric acid and especially tartaric acid, and among the aromatic ortho-hydroxy-carboxylic acids there may be mentioned, for example, those of the benzene series such as 4-, 5- or 6-methyl-1-hydroxybenzene-2-carboxylic acid and above all 1-hydroxybenzene-2-carboxylic acid itself.

The treatment with an agent yielding chromium is advantageously carried out in such manner that a chromiferous dyestuffs is obtained which contains per molecular proportion of dyestuff less than one, and advantageously one half atomic proportion of chromium in complex union. Accordingly, the chroming treatment is advantageously carried out with such an agent yielding chromium and by such a method as yield complex chromium compounds of the aforesaid constitution. It is generally desirable to use less than one atomic proportion of chromium for every molecular proportion of dyestuff and/or to carry out the chroming treatment in a weakly acid to alkaline medium.

The conversion of the dyestuffs into their chromium compounds is advantageously carried out at a raised temperature under atmospheric or superatmospheric pressure, for example, at the boiling temperature of the reaction mixture, if desired, in the presence of a suitable addition, for example, in the presence of a salt of an organic acid, a base, an organic solvent or another agent assisting the formation of the complex.

The dyestuffs obtained according to the aforementioned process can also be prepared according to a modification of this process by reacting a metal free monoazo dyestuff of the Formula I with a chromium complex compound of the same dyestuff containing per molecular proportion of dyestuff about one atomic proportion of chromium in complex union.

The chromium compounds of the dyestuffs of the Formula 1 containing per molecular proportion of dyestuff about one atomic proportion of chromium in complex union used as starting material in this modification of the process are so-called 1:1-complexes which can be prepared by usual methods known in themselves, for example, by reacting the monoazo dyestuffs free from complex-forming metal in an acid medium with an excess of a chromium salt, advantageously a salt of trivalent chromium, such as chromium sulfate or chromium fluoride at boiling temperature or if desired at a temperature exceeding 100° C. For the conversion of the metal-free dyestuffs into the 1:1-complexes it is advisable in general to carry out the chroming in the presence of an organic solvent, such as for example alcohol or formamide.

The reaction of the so-obtained 1:1-chromium complexes with the metal-free dyestuffs is carried out advantageously in an aqueous, neutral to weakly alkaline medium, at ordinary or raised temperature. It is advisable as a rule to react equivalent quantities of the chromiferous 1:1-complex and of the metal-free dyestuff, or to use a certain at the most 20% excess of the chromiferous dyestuff.

The chromium compounds of this invention and modifications thereof are chromium compounds of monoazo-dyestuffs of the general formula

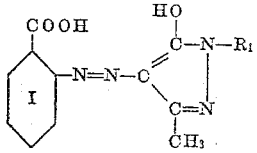

in which $R_1$ represents a benzene radical which is free from groups imparting solubility in water and is bound in the 1-position to the nitrogen atom of the pyrazolone ring and contains an alkyl group in the 2-position, and in which the benzene nucleus I may contain substituents not imparting solubility in water. Especially valuable are the so-called 1:2-chromium compounds of this kind, which contain two molecules of dyestuff bound to one atom of chromium, and above all those which are not further substitued in the nucleus I, and in which the radical $R_1$ contains as its sole substituents an alkyl group of low molecular weight, for example, an alkyl group containing two carbon atoms.

The new chromiferous dyestuffs dissolve surprisingly well in water and in weakly acid aqueous media, and are indeed more soluble than the metal-free dyestuffs from which they have been made. They are suitable for dyeing and printing a very wide variety of materials, above all for dyeing animal materials such as silk, leather and especially wool, but they can also be used for dyeing and printing synthetic fibers of a superpolyamide or superpolyurethane. Wool dyeings produced with these chromiferous dyestuffs from weakly alkaline, neutral or weakly acid, advantageously acetic acid, baths are distinguished by their level character, good properties of wet fastness and very good fastness to light.

The following examples illustrate the invention, the parts and percentages being by weight unless otherwise stated and the relationship of parts by weight to parts by volume being the same as the kilogram to the liter:

*Example 1*

13.7 parts of 2-aminobenzene-1-carboxylic acid are dissolved in 60 parts of water and 24 parts of hydrochloric acid of 30 percent strength and diazotized at 0–5° C. with an aqueous solution of 6.9 parts of sodium nitrite. The resulting diazo-solution is added to a solution, cooled to 10–12° C., of 20.2 parts of 1-(2':6'-dimethylphenyl)-3-methyl-5-pyrazolone, 50 parts by volume of a 2 N-solution of sodium hydroxide, 25 parts by volume of a sodium carbonate solution of 10 percent strength and 100 parts of water. When the coupling is finished, the dyestuff formed is filtered off and washed with dilute sodium chloride solution.

The filter cake so obtained is stirred in 1000 parts of water, and after the addition of 190 parts of a solution of sodium chromosalicylate having a chromium content of 2.6 percent, the whole is boiled for 24 hours under reflux. After cooling the mixture the chromiferous dyestuff is salted out and filtered off and dried in vacuo. It is a yellow-brown powder which dissolves in water with a yellow coloration, and dyes wool from a neutral or acetic acid bath fast yellow tints.

The chroming treatment may also be carried out as follows:

The filter cake is stirred in 1000 parts of water, and after the addition of 28 parts of crystalline sodium acetate and 155 parts of a chromium fluoride solution having a content of chromium corresponding to 4.9 percent of $Cr_2O_3$, the whole is boiled for 24 hours under reflux. The chromiferous dyestuff so obtained is filtered off and dried. It has properties similar to those of the chromium complex described above.

Similar dyestuffs, which dye wool yellow tints, are obtained by treating the monoazo-dyestuffs, which are obtainable from the diazo and coupling components mentioned in columns I and II of the following table, with an agent yielding chromium by the methods described above.

| | I | II |
|---|---|---|
| 1 | COOH, NH₂ (benzene) | HC—C—CH₃, HO—C, N, N—(phenyl with Cl and CH₃) |
| 2 | COOH, NH₂, Cl (benzene) | HC—C—CH₃, HO—C, N, N—(phenyl with H₃C and CH₃) |
| 3 | COOH, NH₂ (benzene) | HC—C—CH₃, HO—C, N, N—(phenyl with CH₃) |
| 4 | COOH, NH₂ (benzene) | HC—C—CH₃, HO—C, N, N—(phenyl with C₂H₅) |

*Example 2*

100 parts of well wetted wool are entered at 40–50° C. into a dyebath which contains in 4000 parts of water 1 part of the chromiferous dyestuff obtainable as described in the first and second paragraphs of Example 1, and 10 parts of crystalline sodium sulfate. 2 parts of acetic acid of 40 percent strength are added, the temperature is raised to the boil in the course of ½ hour, and dyeing is carried on for ¾ hour at the boil. The wool is finally rinsed with cold water and dried. There is obtained a yellow dyeing. The same result is obtained when no acetic acid is added to the dyebath.

*Example 3*

100 parts of well wetted wool are entered at 60° C. into a dyebath which contains in 4000 parts of water 1 part of the dyestuff obtainable by coupling the components mentioned in item No. 3 of the above table, 2 parts of acetic acid of 40 percent strength and 10 parts of crystalline sodium sulfate. The temperature is raised to the boil in the course of 30 minutes and dyeing is carried on at the boil for 45 minutes. 5 parts of sulfuric acid of 10 percent strength are then added and dyeing is continued for a further 15 minutes. The dyebath is cooled to about 70° C., 1.1 parts of potassium bichromate are added, the bath is raised to the boil and chroming is carried out for about 40 minutes at the boil. The wool is dyed a yellow tint which is fast to light.

Example 4

A dyebath is prepared with 4000 parts of water, 1.5 parts of potassium chromate, 1.5 parts of ammonium sulfate, 10 parts of crystalline sodium sulfate and 1 part of the dyestuff obtainable as described in the first paragraph of Example 1. 100 parts of well wetted wool are entered into the dyebath at 60° C., the temperature is raised to the boil in the course of 30 minutes, and boiling is maintained for 45 minutes. There is then added 0.5 part of acetic acid of 40 percent strength and boiling is continued for a further 45 minutes. The wool is dyed a fast yellow tint.

What is claimed is:

1. A dyestuff selected from the group consisting of a monoazo dyestuff of the formula

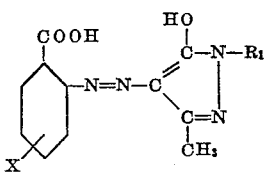

wherein X represents a member of the group consisting of a hydrogen and a chlorine atom, and $R_1$ represents a benzene radical free from groups imparting solubility in water and bound in the 1-position to the nitrogen atom of the pyrazolone ring, which radical contains in the 2-position an alkyl group containing at most 2 carbon atoms, and a complex chromium compound of said monoazo dyestuff containing one chromium atom bound in complex union with substantially two molecules of monoazo dyestuff.

2. A complex chromium compound containing one atom of chromium bound in complex union with substantially two molecules of a monoazo dyestuff of the formula

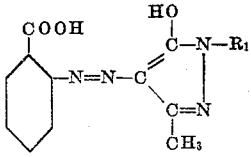

wherein $R_1$ represents a benzene radical free from water solubilizing substituents and bound to the nitrogen atom of the pyrazolone ring in ortho-position relatively to an alkyl group containing at most 2 carbon atoms.

3. A complex chromium compound containing one atom of chromium bound in complex union with substantially two molecules of a monoazo dyestuff of the formula

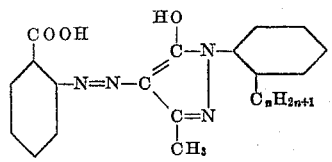

wherein $n$ represents a whole number up to 3.

4. The complex chromium compound containing one atom of chromium bound in complex union with substantially two molecules of the monoazo dyestuff of the formula

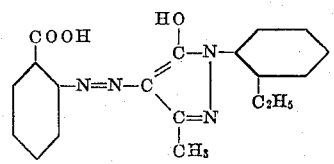

References Cited in the file of this patent

UNITED STATES PATENTS

| | | |
|---|---|---|
| 2,028,981 | Krzikalla et al. | Jan. 28, 1936 |
| 2,464,322 | Krebser et al. | Mar. 15, 1949 |
| 2,681,338 | Harrison et al. | June 15, 1954 |